(12) United States Patent
Joyce

(10) Patent No.: US 8,366,203 B2
(45) Date of Patent: Feb. 5, 2013

(54) BRAKE SYSTEM FOR AUTOMOTIVE VEHICLE

(75) Inventor: John P. Joyce, West Bloomfield, MI (US)

(73) Assignee: Ford Global Technologies, Dearborn, MI (US)

( * ) Notice: Subject to any disclaimer, the term of this patent is extended or adjusted under 35 U.S.C. 154(b) by 311 days.

(21) Appl. No.: 12/897,971

(22) Filed: Oct. 5, 2010

(65) Prior Publication Data

US 2011/0025120 A1 Feb. 3, 2011

Related U.S. Application Data

(63) Continuation-in-part of application No. 11/697,752, filed on Apr. 9, 2007, now Pat. No. 7,748,791.

(51) Int. Cl.
*B60T 13/16* (2006.01)
(52) U.S. Cl. ........ 303/20; 303/11; 303/113.1; 303/115.5
(58) Field of Classification Search ............... 303/11, 303/3, 152, 20, 155, 52, 115.1, 114.1, 115.2, 303/113.5; 188/151 R, 152, 355, 358, 359
See application file for complete search history.

(56) References Cited

U.S. PATENT DOCUMENTS

| | | | |
|---|---|---|---|
| 4,425,005 A * | 1/1984 | Warwick ........................ 303/3 |
| 4,730,877 A * | 3/1988 | Seibert et al. .................. 303/52 |
| 5,492,192 A | 2/1996 | Brooks et al. | |
| 5,511,859 A | 4/1996 | Kade et al. | |
| 5,615,933 A | 4/1997 | Kidston et al. | |
| 5,853,229 A | 12/1998 | Willmann et al. | |
| 5,882,093 A * | 3/1999 | Enomoto et al. ............. 303/152 |
| 5,927,825 A * | 7/1999 | Schenk et al. ............. 303/115.2 |
| 6,070,953 A | 6/2000 | Miyago | |
| 6,142,586 A | 11/2000 | Sakai | |
| 6,164,733 A * | 12/2000 | Uzzell .......................... 303/122 |
| 6,183,050 B1 * | 2/2001 | Ganzel ....................... 303/114.1 |
| 6,231,134 B1 | 5/2001 | Fukasawa et al. | |
| 6,244,674 B1 | 6/2001 | Kuno et al. | |
| 6,454,365 B1 * | 9/2002 | Arwine et al. ................ 303/155 |
| 6,464,307 B1 | 10/2002 | Yoshino | |
| 6,494,547 B2 * | 12/2002 | Higashimura et al. ........ 303/152 |

FOREIGN PATENT DOCUMENTS

| | | | |
|---|---|---|---|
| JP | 10044952 | * | 2/1998 |
| JP | 11055806 | | 2/1999 |
| JP | 2007022105 | | 2/2007 |

OTHER PUBLICATIONS

"Development of Hydraulic Servo Brake System for Cooperative Control with Regenerative Brake." <http://www.sae.org/technical/papers/2007-01-0868>.

\* cited by examiner

*Primary Examiner* — Robert A Siconolfi
*Assistant Examiner* — San Aung
(74) *Attorney, Agent, or Firm* — Jerome R. Drouillard; David Kelley

(57) ABSTRACT

A brake system for an automotive vehicle includes a controller for operating friction and powertrain braking subsystems so that hydraulic pressure to the friction brakes is minimized during powertrain braking, while at the same time emulating the driver-interface operating characteristics of a pure friction-braking system during all operating conditions.

14 Claims, 3 Drawing Sheets

BRAKE SYSTEM FOR AUTOMOTIVE VEHICLE

CROSS REFERENCE

This case is a continuation in part of U.S. patent application Ser. No. 11/697,752, which was, filed on Apr. 9, 2007, now U.S. Pat. No. 7,748,791 and which is hereby incorporated by reference in its entirety.

BACKGROUND

1. Field of the Invention

The present invention relates to a vehicular system for applying both friction and powertrain braking, while maintaining operational characteristics typical of friction-only braking systems.

2. Disclosure Information

Hybrid electric vehicles typically use regenerative braking to achieve enhanced fuel economy. When the vehicle's operator calls for braking, either by releasing the accelerator, or by stepping on the brake, the vehicle may be braked either regeneratively, or by friction brakes, or both. It would be desirable to provide a braking system having relatively invariant response characteristics, so that the vehicle's operator experiences braking performance as a consistent event, independent of the particular mix of friction and regenerative braking prevailing during any particular braking event.

SUMMARY

According to an aspect of the present invention, a brake system for an automotive vehicle includes a number of friction brake modules associated with a plurality of road wheels, and a master cylinder having an input device activated by the operator of a vehicle. At least one isolation valve selectively permits high pressure brake fluid from the master cylinder to actuate the friction brake modules. A compliance and brake application subsystem interposed between the master cylinder and the friction brake modules includes a signal chamber fluidically connected with the output of the master cylinder, with the signal chamber having a movable piston having a first side subject to hydraulic pressure from the master cylinder and from a hydraulic pump, and a second side subject to hydraulic pressure from both the hydraulic pump and a resilient element pressing upon the second side of the movable piston. The second side of the movable piston partially defines a working chamber.

According to another aspect of the present invention, a controller determines the total amount of braking desired by the vehicle operator based upon at least the operator's activation of the master cylinder, with the controller applying the friction brakes with high pressure fluid from the hydraulic pump, and with the controller also selectively providing brake fluid to the signal chamber and the working chamber so that the operating characteristics of the master cylinder and input device emulate a master cylinder and input device used with an operator-applied friction braking system.

According to another aspect of the present invention, a brake system is operable in at least a first state in which an input device is in a braking request mode and neither the master cylinder nor the hydraulic pump apply positive pressure to the friction brake modules, and a second state in which the input device is in a braking request mode and the hydraulic pump applies positive pressure to the friction brake modules.

It is an advantage of the present system that a vehicle operator will experience consistent brake pedal performance, or feel, whether a vehicle is being braked regeneratively, or with friction brakes, or both.

Other advantages, as well as features of the present invention, will become apparent to the reader of this specification.

DESCRIPTION OF INVENTION

Figure 1:
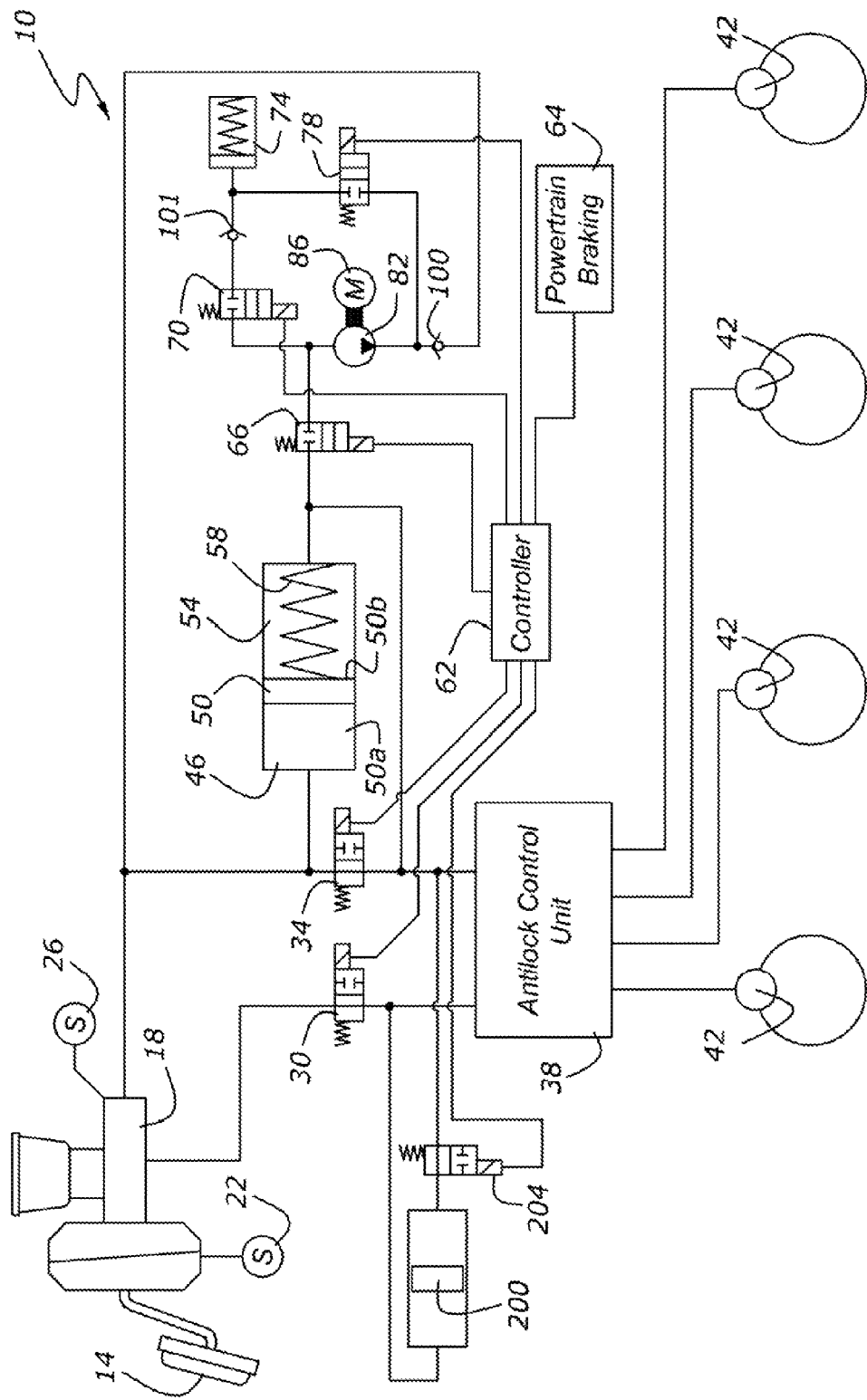
FIG. 1 is a schematic representation of a braking system according to an aspect of the present invention.

As shown in FIG. 1, brake system 10 uses at least one operator-activated input device. As used in this context, the term "operator" means a human driver or motorist. In the illustrated embodiments, the input device is a brake pedal, 14. Those skilled in the art will appreciate in view of this disclosure that other types of operator-activated input devices could be used, such as an accelerator pedal, or other types of manual or motorist-programmable controls. Brake system 10 includes not only friction braking, but also a powertrain braking subsystem, 64, which may be configured as either a regenerative, or non-regenerative electric or fluidic, or other type of powertrain braking system known to those skilled in the art and suggested by this disclosure.

Brake pedal 14 actuates a dual hydraulic master cylinder, 18, feeding two hydraulic circuits. Master cylinder 18 has two sensors, 22 and 26. Sensor 22 is a pedal position sensor, and sensor 26 is a hydraulic pressure sensor. Either or both sensors, or yet other types of sensors may be employed to notify controller 62 that the motorist desires braking.

Fluid leaving master cylinder 18 moves toward antilock unit 38. During normal operation, however, fluid is blocked from reaching ABS unit 38 by auxiliary isolation valve 30 and principal isolation valve 34, which are normally open valves. In the event that operation of the electronically boosted portion of the present braking system becomes compromised, valves 30 and 34 will remain open, and working chamber valve 66 will be closed, thereby allowing fluid to proceed directly from master cylinder 18 to ABS unit 38 and friction brake modules 42. Valves 66, 70, 78, and 90 are all shown in FIGS. 1-3 as normally-closed valves. Those skilled in the art will recognize that some or all can be replaced by normally-open valves to optimize a design—particularly in consideration of potential failure modes and to support evacuation and filling of the brake system during vehicle assembly.

As further shown in FIG. 1, a first embodiment of the present system also includes a compliance brake application subsystem, including signal chamber, 46, which is connected with the output of master cylinder 18. Signal chamber 46 has an moveable piston, 50, with a first side, 50a, subject to hydraulic pressure from master cylinder 18, as well as pressure from pump 82, which is driven by motor 86. A second side, 50b, of piston 50, is subject to hydraulic pressure from pump 82, as well as spring 58, which functions as a resilient element. In essence, moveable piston 50 modulates brake pressures in the circuits connected with chambers 46 and 54.

During operation of the present system concurrently with powertrain-only braking, valves 30 are 34 closed, and working chamber valve 66 is open. This allows pump 82 to withdraw fluid from working chamber 54. Opening low pressure valve 70 allows pump 82 to withdraw fluid from accumulator 74. Pump 82 can provide fluid to either accumulator 74, if compliance valve 78 is open, or to master cylinder 18 and signal chamber 46. Because pump 82 is able to draw fluid from working chamber 54, it is possible to bring the hydraulic pressure in the circuit connected to principal isolation valve 34 to zero. While operating in this manner, pressure increases within working chamber 54 are controlled by principal isolation valve 34, whereas pressure decreases are controlled by working chamber valve 66.

Because the hydraulic pressures acting on both sides of piston 50 are controlled by system controller 62, the operating characteristics of master cylinder 18 and brake pedal 14 emulate a master cylinder and input device typically used with an operator-applied friction braking system. In other words, the mechanical feel of the brake pedal, while the system is operating in a full powertrain braking mode is indistinguishable from the feel of a conventional friction braking system.

When sufficient powertrain braking is not available to meet demand, controller 62 will direct pump 82 to push fluid through principal isolation valve 34 to ABS unit 38.

The embodiment of FIG. 1 includes two check valves, 100, and 101. Check valve 100 can serve three functions. When valve 78 is open, check valve 100 assures that accumulator 74 is filled with fluid from pump 82, and not fluid from master cylinder 18. This is important because the braking system can maintain a constant master-cylinder brake pressure, while changing the pressure difference between chambers 46 and 54, thus lowering pressure in some or all of the brakes 42, depending on inclusion of an isolation piston, and isolation piston valve shown at 200 and 204, respectively in FIG. 1. Check valve 100 also keeps fluid from flowing into accumulator 74 if valve 78 fails or leaks. Finally, check valve 100 damps pressure disturbances from pump 82. Check valve 101 enhances the robustness of the present braking system by handling any incidental leak or failure of valve 70. If there is a power loss or other general system impairment, normal feel of pedal 14 will be preserved, because fluid will not be pushed into accumulator 74. Isolation piston 200 and isolation piston valve 204 are important because they permit regenerative braking with a diagonal split braking system in which the hydraulic brakes are divided diagonally into two circuits, with, for example, the left front and the right rear brake hydraulics being interconnected. If the pressure falls off within either circuit, piston 200 will bottom out, allowing pressure to be developed within the remaining circuit.

Figure 2:
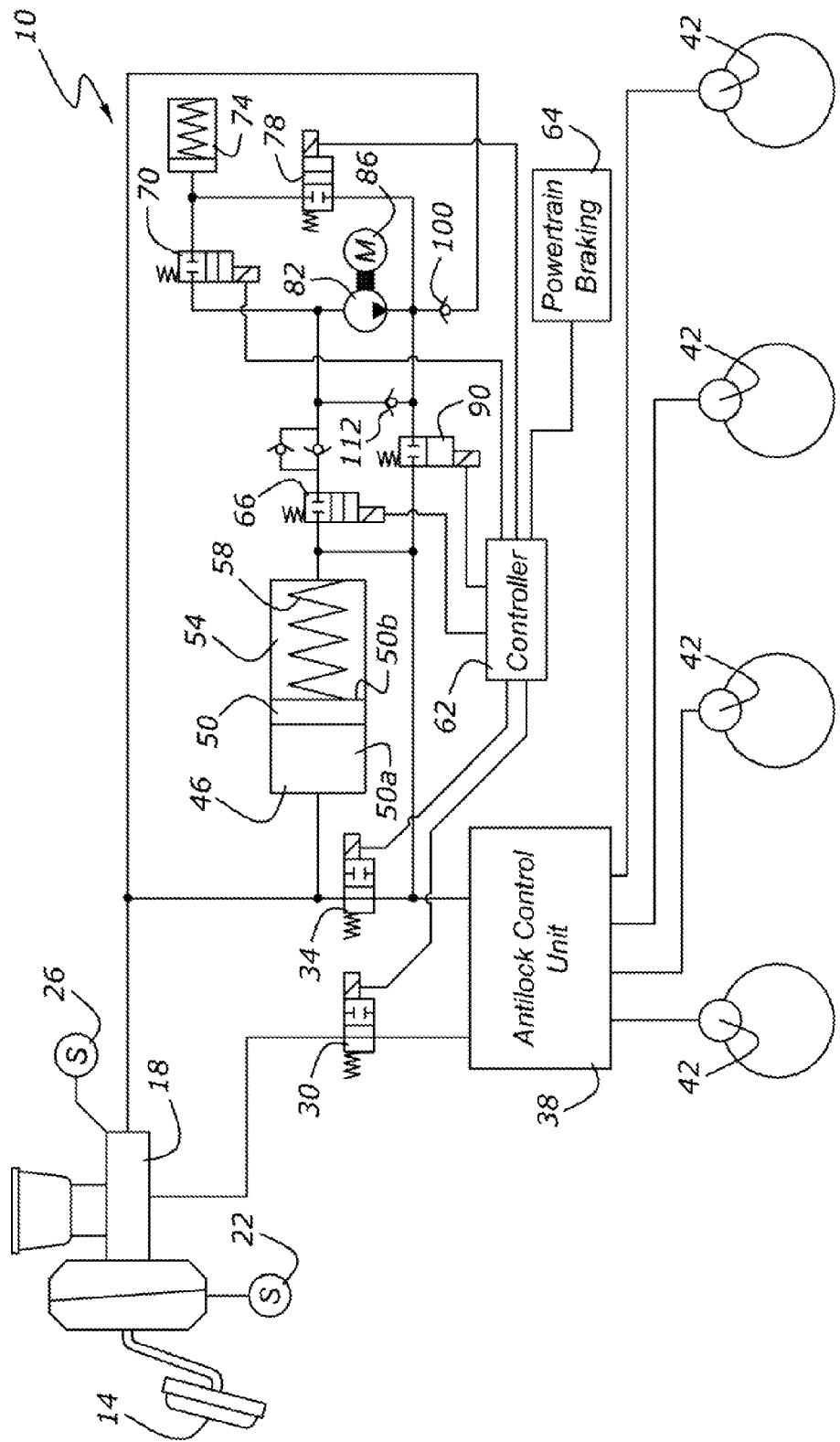
FIG. 2 is similar to FIG. 1, and is also schematic representation of a braking system according to an aspect of the present invention.

In the embodiment of FIG. 2, pressure increase valve 90 is arranged to provide an additional path to increase pressure to working chamber 54. This isolates master cylinder 18 from pressure disturbances which could originate from pump 82.

Figure 3:
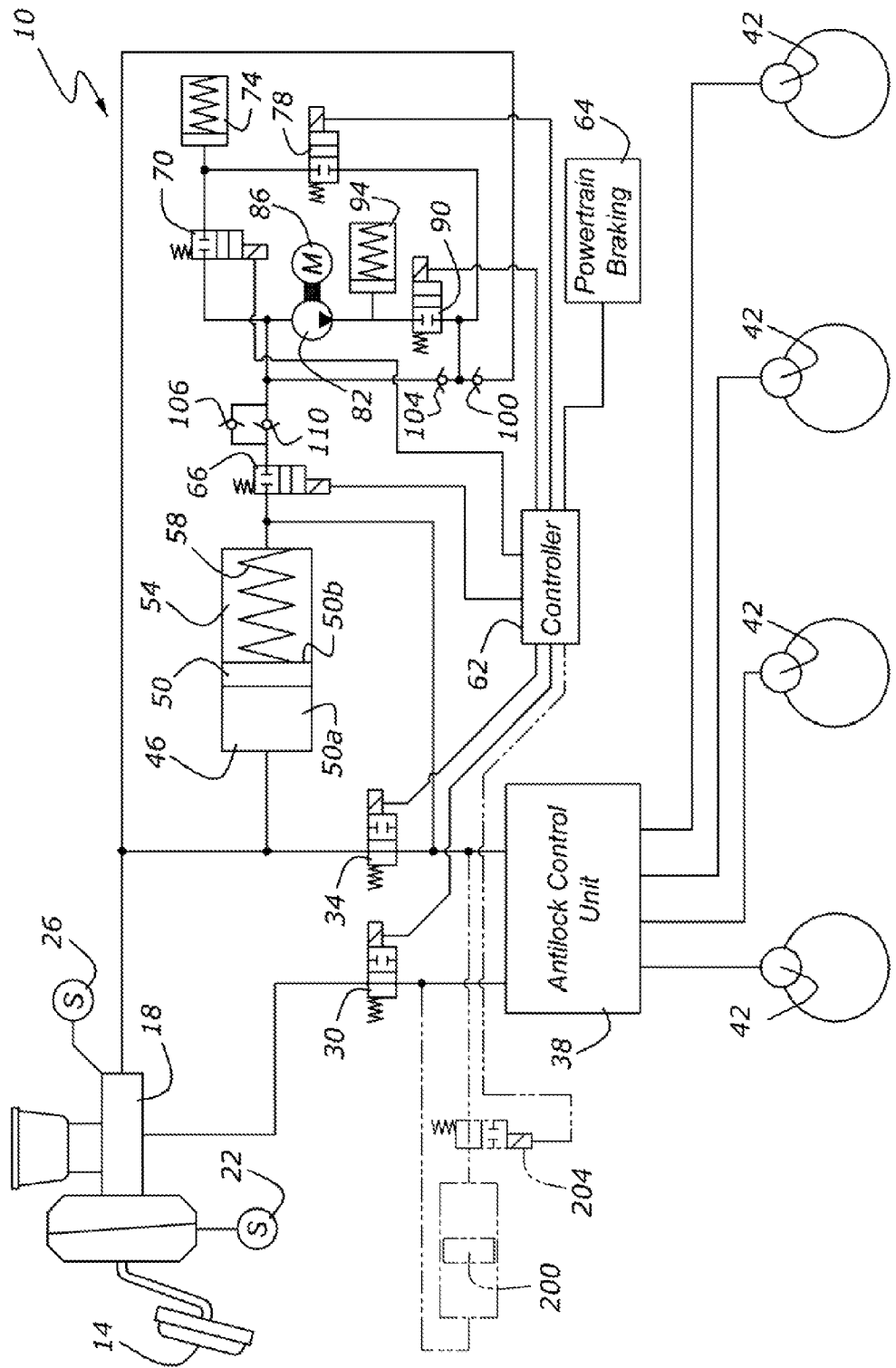
FIG. 3 is a third schematic representation of a braking system according to an aspect of the present invention.

In the embodiment of FIG. 3, damping chamber/high pressure accumulator 94 is added to the output side of pump 82. Chamber 94 helps to prevent pressure disturbances from reaching master cylinder 18 and brake pedal 14. Check valve 100 functions in a manner similar to that ascribed for the embodiment of FIG. 1. Check valve 104 serves two functions. The first is to bypass pump 82. Accordingly, check valve 104 is mounted in bypass conduit 99 extending from the inlet side of pump 82 to the outlet side of pump 82. During rapid brake applications, the large amount of fluid which must leave chamber 54 could overwhelm pump 82, causing unwanted pedal resistance, as well as unwanted pressure increases in chamber 54 and some or all of brakes 42, depending upon the inclusion of isolation piston 200. Check valve 104 also assures that fluid at the outlet of pump 82 will not go back to chamber 54 or brakes 42. As a result, valves 66, 70, 78, and 90 may be modulated to take fluid from chamber 54 and brakes 42. Also, fluid taken from chamber 54 and brakes 42 may be stored in accumulator 94, maintaining pressure in chamber 54 and some or all of brakes 42, (depending upon inclusion of isolation piston 200) as pedal travel, pedal force, and the pressure in chamber 46 all increase. Finally, fluid taken from chamber 54 and stored in accumulator 74, maintains pressure in chamber 54 and brakes 42, again while pedal travel, pedal force, and pressure in chamber 46 all increase.

Check valve 106, which is shown in FIG. 3, functions only to allow flow opposite to the direction of check valve 110, with check valve 110 having key functionality. Flow through check valve 106 is needed to decrease the pressure difference between chambers 46 and 54, increasing pressure in some or all of brakes 42 (once again depending upon the inclusion of isolation piston 200), while maintaining a constant pressure in master cylinder 18. Check valve 110, on the other hand, functions to provide a pressure drop when fluid is flowing through the valve. This prevents pump 82 from developing an unwanted vacuum in brakes 42.

The function of check valve 112, shown in FIG. 2, is similar to check valve 104 (FIGS. 1 and 3). Check valve 112 bypasses pump 82, preventing unwanted noise, pressure disturbances, and unwanted pedal resistance. Check valve 112 also assures that fluid at the outlet of pump 82 will not go back to chamber 54 or brakes 42.

Although the present invention has been described in connection with particular embodiments thereof, it is to be understood that various modifications, alterations, and adaptations may be made by those skilled in the art without departing from the spirit and scope of the invention set forth in the following claims.

What is claimed is:

1. A brake system for an automotive vehicle, comprising:
 a plurality of friction brake modules associated with a plurality of road wheels;
 a master cylinder having an input device activated by the operator of a vehicle;
 at least one isolation valve selectively permitting high pressure brake fluid from the master cylinder to actuate said friction brake modules; and
 a compliance and brake application subsystem interposed between the master cylinder and said friction brake modules, with said compliance and brake application subsystem comprising:
  a signal chamber fluidically connected with the output of said master cylinder, with said signal chamber having a movable piston having a first side subject to hydraulic pressure from the master cylinder and from a hydraulic pump, and a second side subject to hydraulic pressure from both said hydraulic pump and a resilient element pressing upon the second side of the movable piston, and with the second side of the movable piston partially defining a working chamber; and
  a controller determining the total amount of braking desired by the vehicle operator based upon at least the operator's activation of the master cylinder, with the controller applying the friction brakes with high pressure fluid from said hydraulic pump, and with the controller also selectively providing brake fluid to the signal chamber and the working chamber so that the operating characteristics of the master cylinder and input device emulate a master cylinder and input device used with an operator-applied friction braking system.

2. The brake system according to claim 1, further comprising a powertrain braking subsystem operated by said controller.

3. The brake system according to claim 2, wherein said powertrain braking subsystem comprises a regenerative braking system.

4. The brake system according to claim 1, further comprising an accumulator selectively receiving fluid from the hydraulic pump.

5. The brake system according to claim 1, further comprising a combination damping chamber and high pressure accumulator connected with the outlet of the hydraulic pump.

6. The brake system according to claim 1, wherein said input device comprises a brake pedal.

7. The brake system according to claim 1, wherein said brake system is operable in at least a first state in which the input device is in a braking request mode and neither the master cylinder nor the hydraulic pump apply positive pressure to the friction brake modules, and a second state in which the input device is in a braking request mode and the hydraulic pump applies positive pressure to the friction brake modules.

8. The brake system according to claim 1, further comprising a check valve located in a bypass conduit extending from an inlet side of said hydraulic pump to an outlet side of said pump, with the inlet side of said pump being operatively connected with said working chamber.

9. The brake system according to claim 1, wherein said master cylinder comprises a dual master cylinder feeding two hydraulic circuits, with said system having an isolation piston, whereby a loss of hydraulic pressure within one of said hydraulic circuits will not prevent pressure from building within the other of said hydraulic circuits.

10. A brake system for an automotive vehicle, comprising:
a powertrain braking subsystem;
a plurality of friction brake modules associated with a plurality of road wheels;
a master cylinder having an input device activated by the operator of a vehicle;
at least one isolation valve selectively permitting high pressure brake fluid from the master cylinder to actuate said friction brake modules; and
a compliance and brake application subsystem interposed between the master cylinder and said friction brake modules, with said compliance and brake application subsystem comprising:
a signal chamber fluidically connected with the output of said master cylinder, with said signal chamber having a movable piston having a first side subject to hydraulic pressure from the master cylinder and from a hydraulic pump, and a second side subject to hydraulic pressure from both said hydraulic pump and a resilient element pressing upon the second side of the movable piston, and with the second side of the movable piston partially defining a working chamber; and
a controller operating the powertrain braking subsystem as well as the friction brake modules, with the controller determining the total amount of braking desired by the vehicle operator based upon at least the operator's activation of the master cylinder, and with the controller applying the friction brakes with high pressure fluid from said hydraulic pump, and with the controller also selectively providing brake fluid to the signal chamber and the working chamber so that the operating characteristics of the master cylinder and input device emulate a master cylinder and input device used with an operator-applied friction braking system.

11. The brake system according to claim 10, wherein said input device comprises a brake pedal.

12. The brake system according to claim 10, wherein said powertrain braking subsystem comprises a regenerative braking system.

13. The brake system according to claim 10, wherein said brake system is operable in at least a first state in which the input device is in a braking request mode and neither the master cylinder nor the hydraulic pump apply positive pressure to the friction brake modules, and a second state in which the input device is in a braking request mode and the hydraulic pump applies positive hydraulic pressure to the friction brake modules.

14. The brake system according to claim 10, further comprising a check valve located in a bypass conduit extending from an inlet side of said hydraulic pump to an outlet side of said pump, and with the inlet side of said pump being operatively connected with said working chamber, whereby fluid will be allowed to leave the working chamber without passing through the pump.

\* \* \* \* \*